United States Patent
Rotole et al.

(10) Patent No.: US 7,458,620 B2
(45) Date of Patent: Dec. 2, 2008

(54) BALER NEEDLE CLAMP ARRANGEMENT FOR FACILITATING SIDE-TO-SIDE ADJUSTMENT OF OUTER NEEDLE END

(75) Inventors: David Vincent Rotole, Ottumwa, IA (US); Roger William Frimmi, Ottumwa, IA (US); Jason Chad Eubanks, Hedrick, IA (US); Randal Alan Cufr, Oskaloosa, IA (US)

(73) Assignee: Deere & Company, Moline, IL (US)

( * ) Notice: Subject to any disclaimer, the term of this patent is extended or adjusted under 35 U.S.C. 154(b) by 43 days.

(21) Appl. No.: 11/673,216

(22) Filed: Feb. 9, 2007

(65) Prior Publication Data
US 2008/0190306 A1  Aug. 14, 2008

(51) Int. Cl.
*B65H 69/04* (2006.01)
(52) U.S. Cl. ....................................................... 289/16
(58) Field of Classification Search .................. 289/16; 403/167, 187–201; 100/24
See application file for complete search history.

(56) References Cited

U.S. PATENT DOCUMENTS

| | | | | |
|---|---|---|---|---|
| 2,287,761 | A * | 6/1942 | Matthysse | 439/804 |
| 2,547,932 | A * | 4/1951 | Downs, Jr. | 439/100 |
| 3,550,969 | A * | 12/1970 | Robinson | 403/8 |
| 4,102,260 | A | 7/1978 | White | |
| 4,102,261 | A * | 7/1978 | White | 100/24 |
| 4,463,668 | A | 8/1984 | Jackson et al. | |
| 7,309,054 | B2 * | 12/2007 | Slatter et al. | 248/521 |

* cited by examiner

*Primary Examiner*—Shaun R Hurley

(57) ABSTRACT

A clamp arrangement for securing a needle to a needle support member includes an interface arrangement between a first clamp segment, defining an inner end of a baler needle, and a surface of a needle support member, on which a second clamp segment is located on a side of the support member opposite to that engaged by the first clamp segment. The interface arrangement is such as to permit the needle to be rocked sideways so as to adjust an outer twine delivery end of the needle from side-to-side as necessary to bring the twine delivery end in correct alignment with a knotter mechanism.

8 Claims, 4 Drawing Sheets

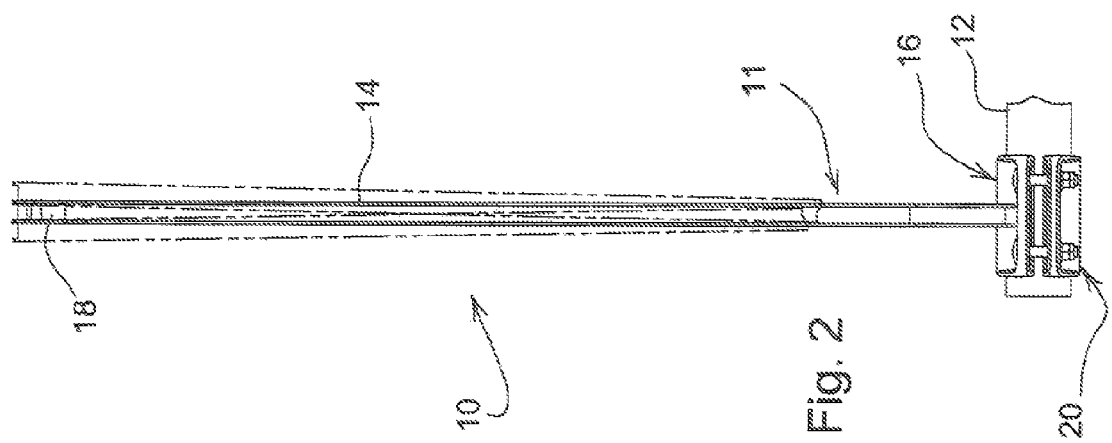
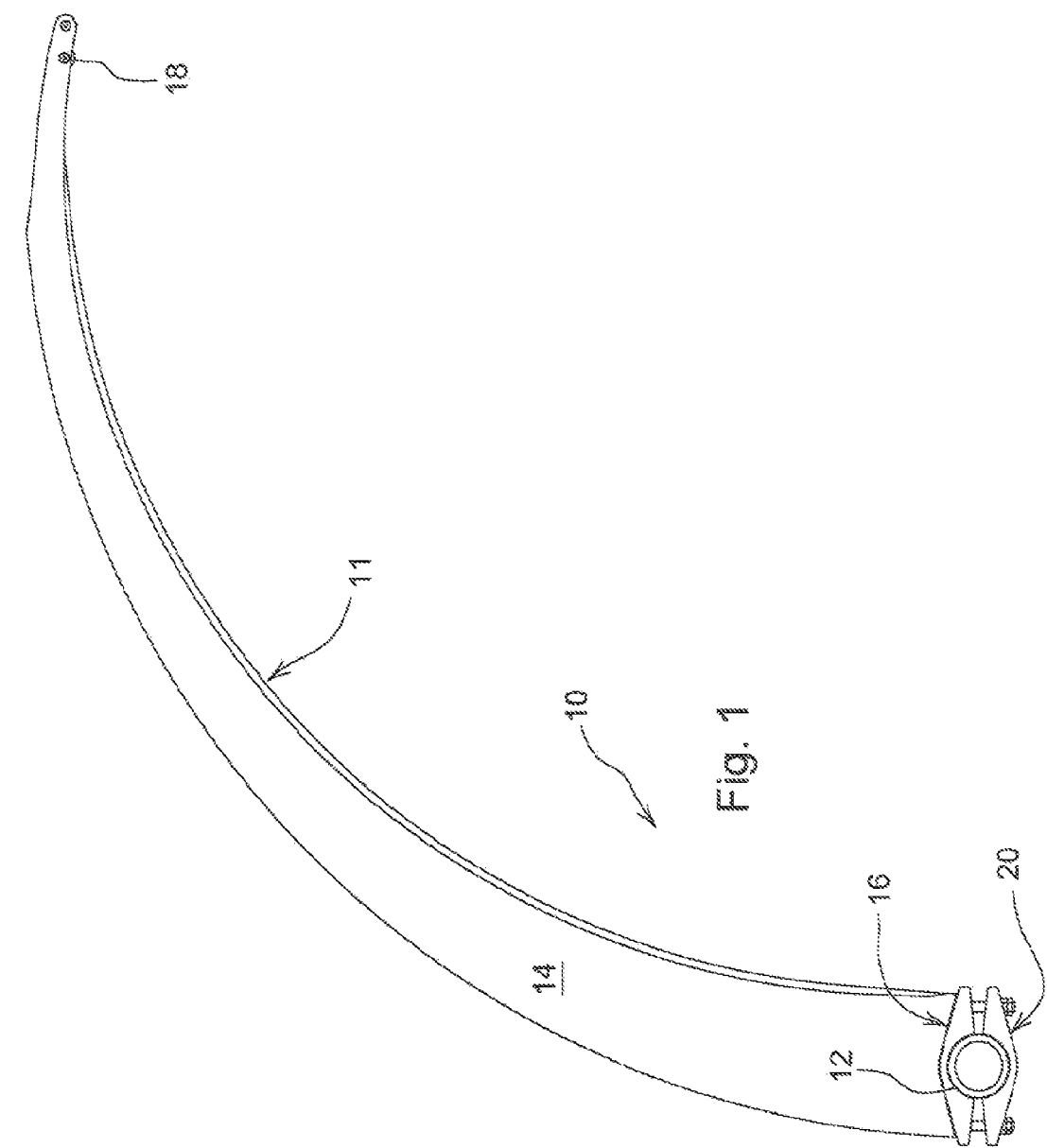

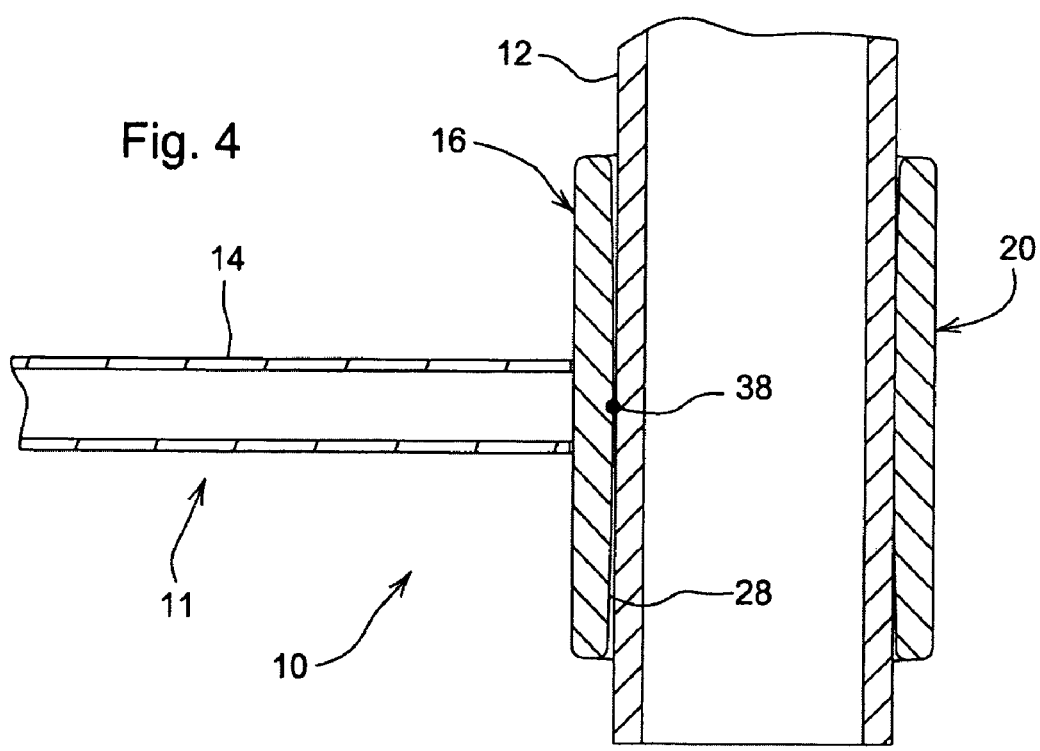
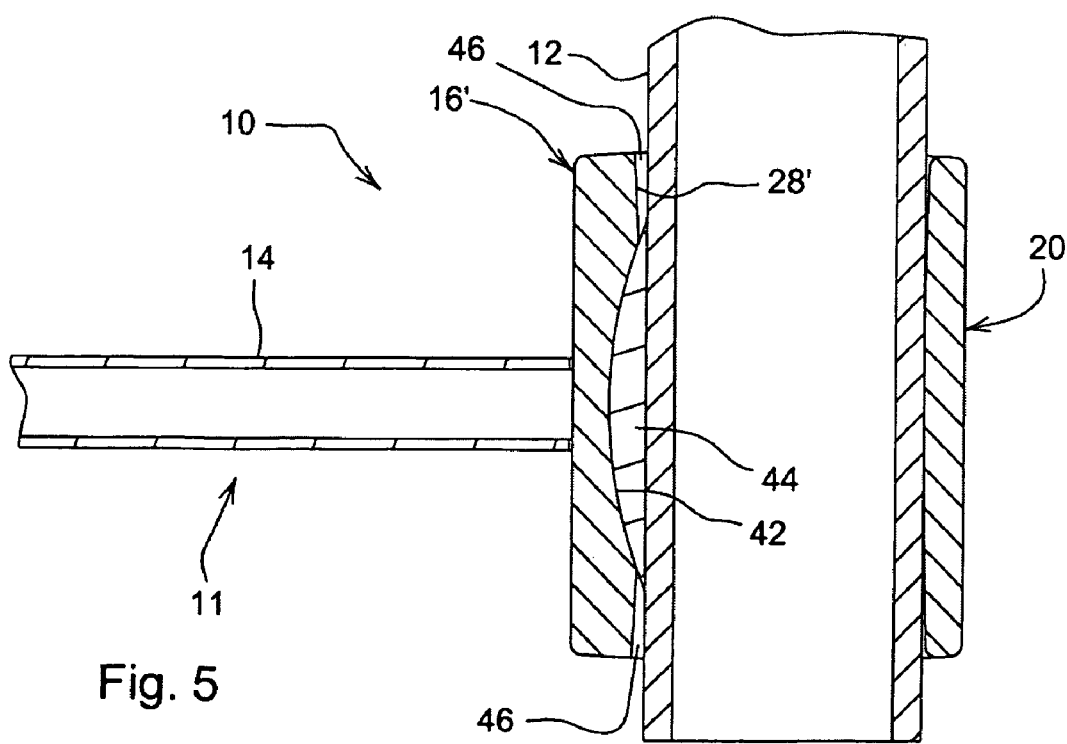

BALER NEEDLE CLAMP ARRANGEMENT FOR FACILITATING SIDE-TO-SIDE ADJUSTMENT OF OUTER NEEDLE END

FIELD OF THE INVENTION

The present invention relates to balers for making parallelepiped bales and more particularly relates to needle assemblies for such balers.

BACKGROUND OF THE INVENTION

Balers, both large and small, for forming parallelepiped bales typically use a needle assembly including a plurality of needles, cantilever-mounted to a transverse support member, to deliver twine through the bale chamber between adjacent ends of a just finished bale and starting bale to respective knotter mechanisms of a knotter assembly to complete the tie cycle on the finished bale and to start the next. Each of the needles must be accurately positioned at the top of its cycle in order to correctly place the twine in the associated knotter mechanism located on the opposite side of the bale chamber from the area occupied by the needles when the latter are in their at rest or standby position. The support member for the needles is typically mounted for swinging through an arc to move the needles as a unit. In addition to each of the needles having to be properly positioned for placing the twine into the associated knotter mechanism, needle position is also critical as the needles move through the arc because of the close proximity of baler components through which they must pass, e.g., the bale chamber floor and top, the plunger face, and the knotter assembly.

On large balers, the cantilever connection of each needle is typically through a clamp arrangement. This can consist of two clamp segments that are clamped around a round tube. The length of the tube is perpendicular to the direction of travel of the needle mechanism during the tie cycle. One clamp segment is welded to the tube while the other defines an inner end of a needle. Each clamp segment has a generally semi-cylindrical surface sized to mate with the tube outer surface. The clamp segments each extend around less than half the circumference of the tube which leaves a space between the clamp segments when they are in position so that the clamp segment defining the inner end of the needle can be rotated relative to the tube. Four bolts, one on each corner of a given clamp arrangement, are used to force the clamp against the tube to provide the desired clamping force. The fore-and-aft position of the needle tip can be adjusted by loosening the two bolts at one end of the clamp arrangement and tightening the opposite pair to rotate the needle clamp segment slightly around the clamp tube. Side-to-side needle tip adjustments however cannot be made in this fashion because the clamp-to-tube contact is solid in this direction. Heretofore, side-to-side needle tip adjustments have been made by physically bending each needle until it is correctly positioned.

The problem to be solved then is how to construct a needle clamping arrangement so as to permit side-to-side needle adjustments as well as fore-and-aft adjustments.

SUMMARY OF THE INVENTION

According to the present invention there is provided a novel needle clamping arrangement.

An object of the invention is to provide a needle clamping arrangement permitting both side-to-side needle adjustments, as well as fore-and-aft adjustments, of the needle tip. This object is accomplished by clamping arrangements wherein the interface between clamping surfaces of the clamping arrangement is shaped to permit side-to-side as well as fore-and-aft adjustments to be made to correctly position the needle tip.

This and other objects will become apparent from a reading of the ensuing description together with the appended drawings.

BRIEF DESCRIPTION OF THE DRAWINGS

FIG. 1 is a side view of a baler needle assembly constructed in accordance with the present invention.

FIG. 2 is a right side view of the baler needle assembly shown in FIG. 1, but showing only one needle and showing in broken lines positions at opposite sides of a desired position which the needle may assume before being adjusted.

FIG. 4 is a sectional view taken horizontally through the mounting clamp assembly of FIG. 3.

FIG. 5 is a sectional view like that of FIG. 4, but showing an alternate embodiment employing a separate mounting piece having an inner cylindrically shaped surface engaged with the needle carrier tube and having an outer surface which is generated by rotating a cylindrical segment about an axis located in a plane bisecting the clamp segment that is fixed to the needle support member.

DESCRIPTION OF THE PREFERRED EMBODIMENTS

Figure 3:
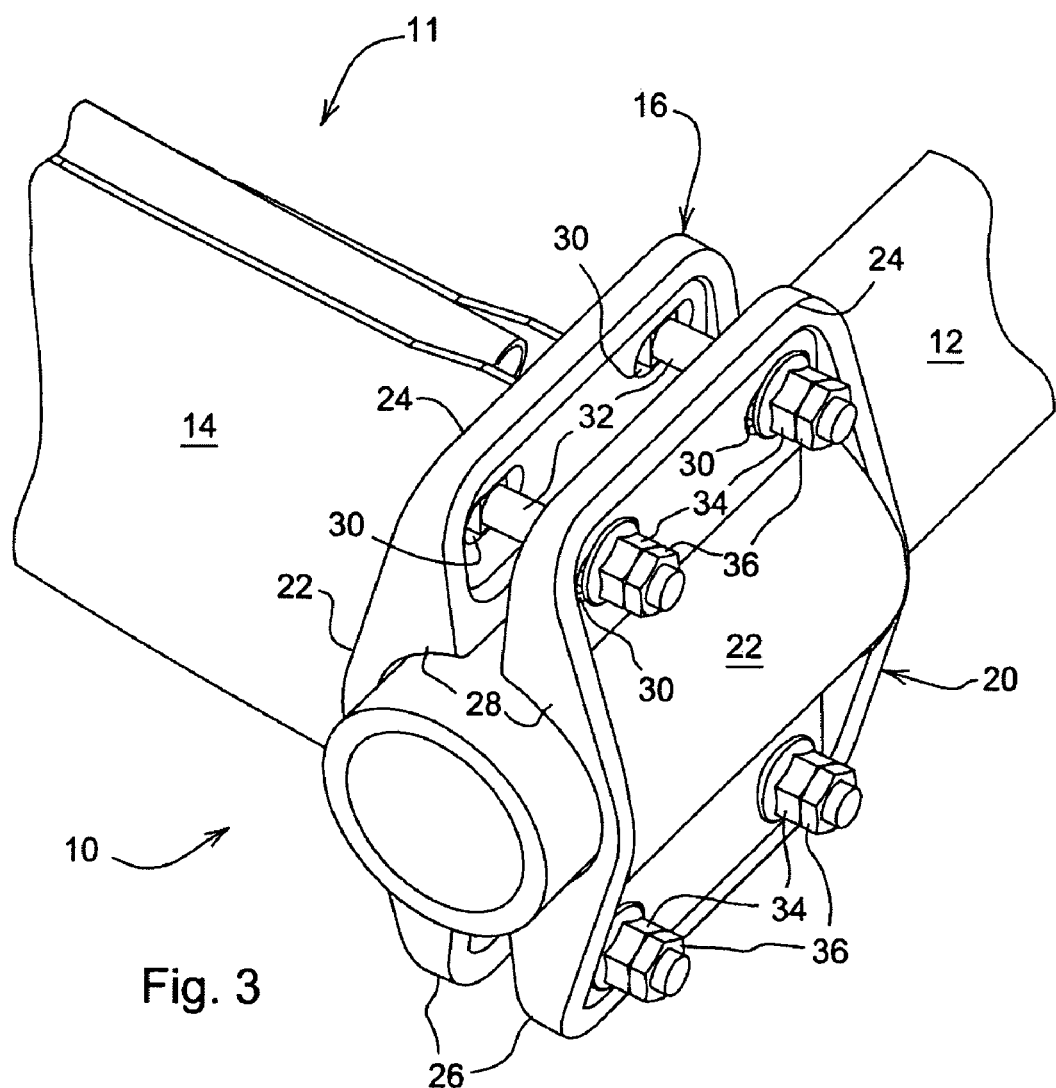
FIG. 3 is a perspective view showing the mounting clamp assembly securing the needle to the needle support member.

Referring now to FIG. 1, there is shown a typical needle assembly 10 used in a baler for making parallelepiped bales. The needle assembly 10 includes a plurality of needles 11 (only one shown) mounted at spaced locations along a tubular cylindrical needle support member 12, with the total numbr of needles 11 depending on the cross sectional dimension of a bale to be produced by the baler. As is well known, each needle 11 is responsible for delivering a strand of twine through the baling chamber of the baler and to an associated knotter mechanism so that the strand may be tied about a bale, which has reached a desired length in the baling chamber.

The needle 11 includes an elongate, curved body 14 which increases in width from an inner end drfined by a first clamp segment 16 and an outer, twine-delivery end which carries a roller 18 that is used to engage and guide twine towards a knotter mechanism located on an opposite side of the baling chamber from a location where the support member 12 is mounted for swinging along an arcuate path between a standby position, wherein the needles 11 are located with their outer twine-delivery ends withdrown from, but adjacent to, the baling chamber, and a twine-delivery position, wherein the needles extend through the baling chamber with their outer ends being adjacent respective associated knotter mechanisms. A clamp segment 20, here shown as a being identical in shape to the clamp segment 16, is welded in place on the support member 12.

As can best be seen in FIG. 3, each of the clamp segments 16 and 20 includes a central portion 22 joined to top and bottom flanges 24 and 26, respectively and have an inner surface 28 shaped substantially complementary to, and engaged with, a cylindrical exterior of the support member 12. Each of the flanges 24 and 26 contains two holes 30, with the four holes of each clamp half being elongated in a direction parallel with a longitudinal axis of the support member 12, arranged in a rectangular pattern, and respectively aligned with the four holes provided in the other clamp half. A bolt 32 is received in each pair of aligned holes 30, with a shoulder nut 34 and a jam nut 36 being received on a threaded end of each bolt 32. Instead of four bolts 32 being used, a clamp arrangement employing to U-bolts would work just as well.

Referring now to FIG. 4, it can be seen that inner surface 28 of the clamp segment 16 is tapered from opposite ends to a crown 38 located in a plane in alignment with a plane passing centrally between opposite surfaces of the needle body 14. This makes it possible to adjust the outer end of the needle body 14 through a range shown in broken lines in FIG. 2, by loosening the bolts located on one side of the crown 38, while tightening the bolts on the other side of the crown 38. Instead of, or in addition to, the crown 38, a mirror image to the surface 28 could be provided on the support member 12.

FIG. 5 shows an alternative embodiment wherein the inner end of the needle 11 is defined by a clamp segment 16' including an inner surface 28' including a central surface section 42 shaped cylindrically about an axis extending in a direction perpendicular to a central axis of the support member 12. Seated against the cylindrically shaped central surface section 42 is a cylindrical outer surface of a crown member 44 having an interior surface shaped complementary to, and seated against, the cylindrical exterior of the tubular support member 12. The crown member 44 may be fixed to the support member 12, as by welding, for example, and thus may be considered part of the support member, or it may be provided as a separate piece. When the clamp segment 16' is disposed centrally on the crown member 44, gaps 46 are defined between opposite ends of the inner surface 28' and the support member 12. If it is necessary to adjust the side-to-side position of the outer end of the needle 11, this maybe done by loosening the nuts 34 and 36 on the bolts 32, adjusting the clamp segment 16' about the cylindrical surface of the crown member 44 and re-tightening the nuts 34 and 36. It will be understood that instead of the surface 42 being formed in the clamp segment 16', it could instead be provided as a cylindrically contoured groove in the exterior of the support member 12, with the crown member 44 then being replaced by a similar member inverted so as to fit the cylindrical surface of the clamp segment 16' and the cylindrical groove provided in the support member 12.

Figure 6:
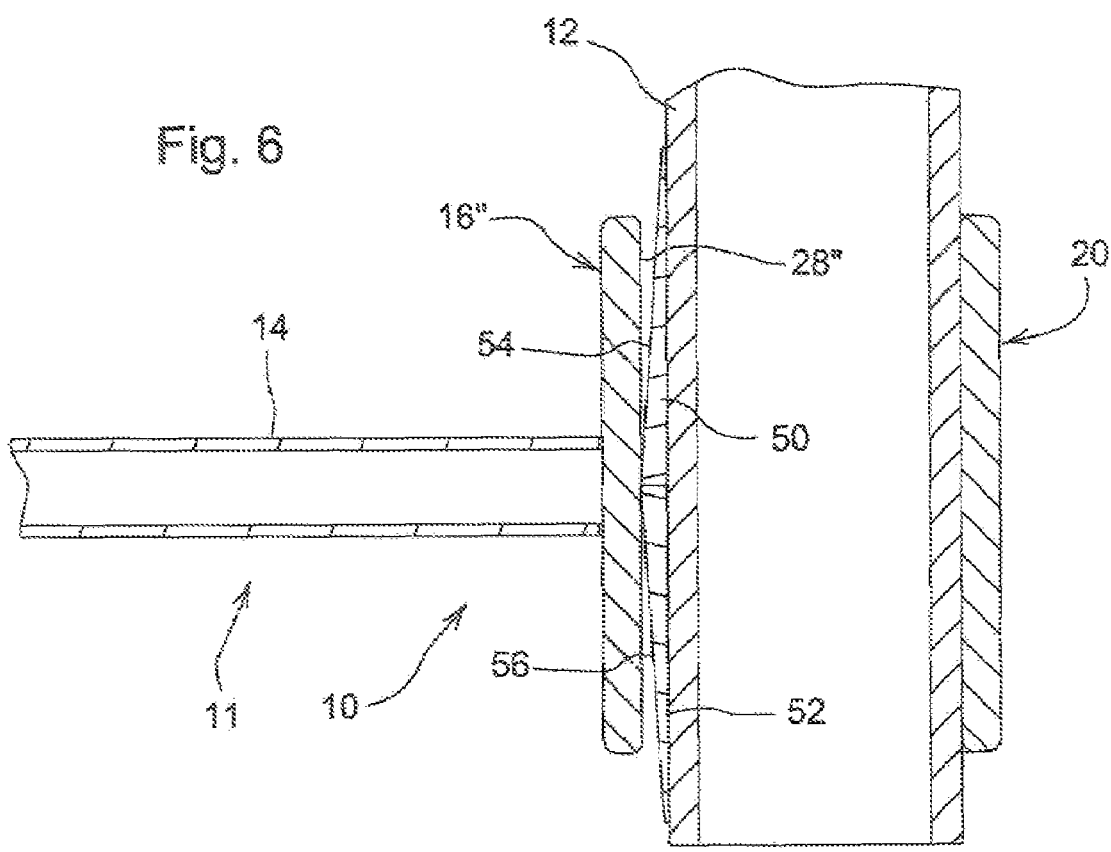
FIG. 6 is a sectional view like that of FIG. 4, but showing a further alternate embodiment employing a pair of generally semi-cylindrical, tapered shims having ends at their thicker dimensions abutting each other at a central plane passing through the needle.

FIG. 6 shows and alternate embodiment wherein the inner end of the needle 11 is defined by a clamp segment 16" having an inner surface 28" formed at a radius somewhat larger than the radius of the outer surface of the support member 12. Inserted between the clamp segment 16" and the support member 12 are two slightly tapered shims or wedges 50 and 52, having their thicker dimensioned ends engaged with each other at a central plane passing through the needle clamp segment 16". Thus, outer surfaces 54 and 56, respectively, of the shims 50 and 52 diverge from the inner surface 28" of the clamp segment 16" in opposite directions from the central plane. In effect, the shims 50 and 52 form a crown on the support member 12. It will be appreciated that a pair of shims could similarly be used to form a crown on the cylindrical inner surface 28" of the clamp segment 16", in which case the shims would have outer, cylindrically curved surfaces. Alternatively, a slightly tapered shim which extends lengthwise, completely through a gap defined between the clamp segment 16" and the outer surface of the support member 12 could be used, with the direction of insertion into the gap depending on the direction in which the needle 11 needs to be cocked in order to appropriately adjust its outer end.

Thus, it will be appreciated, that by providing an appropriate profile at a clamping surface arrangement of the clamp segments 16, 16' or 16" with the support member 12, clamping forces can be applied to the clamp segments 16, 16' or 16" so as to effect side-to-side adjustment of the outer twine-delivery end of the needle 11.

Having described the preferred embodiment, it will become apparent that various modifications can be made without departing from the scope of the invention as defined in the accompanying claims.

The invention claimed is:

1. In a baler needle assembly including a needle support member extending transversely to a direction of movement of the needle support member, during a tying cycle, and a plurality of needles mounted at spaced locations along said needle support member, each of said needles being curved between an inner end and an outer twine-delivery end, a clamping arrangement securing said inner end of said needle to said needle support member and including a plurality of clamping bolts carrying nuts which may be individually loosened and tightened, the improvement comprising: at least one of said clamping arrangement and needle support member including clamping surfaces configured such that by selectively loosening and fully tightening said plurality of clamping bolts said twine delivery end of said needle may be adjusted from side-to-side.

2. The baler needle assembly, as defined in claim 1, wherein said clamping arrangement including a first clamp segment defining said inner end of said needle and said clamping surfaces including a first surface of said first clamp segment and a second surface extending lengthwise of said needle support member; a second clamp segment engaging a third surface of said needle support member located on a side opposite from said second surface; one of said first and second surfaces being crowned between opposite ends; and said plurality of clamping bolt assemblies including nut pairs located at opposite sides of said crown and being threaded onto bolt ends for clamping said first and second clamp segments together for causing said first clamp segment to tilt about said crown, thereby resulting in side-to-side adjustment of said twine delivery end of the needle.

3. The baler needle assembly, as defined in claim 1, wherein said inner end of said needle is defined by a first clamp segment having an inner surface disposed for being clamped against a first location of said needle support member, with the inner surface of the first clamp segment being joined to oppositely extending first and second flanges, a second clamp segment being engaged with said needle support member at a second location of said needle support member, which is directly opposite from said first location, with said second clamp segment having third and fourth, oppositely extending flanges respectively located in opposing relationship to said first and second flanges, said first and third flanges containing first and second sets of aligned mounting holes, and said second and fourth flanges containing third and fourth sets of aligned mounting holes, said first nut and bolt pair being associated with said first and third sets of mounting holes, and said second nut and bolt pair being associated with said second and fourth sets of mounting holes; and said first location of said clamp needle support member and said inner surface of said first clamp segment being so configured and arranged so as to define said crown permitting said first clamp segment to be titled about said crown so as to effect said side-to-side adjustment of said twine delivery end of said needle.

4. The baler needle assembly, as defined in claim 2, wherein said needle is symmetrical about a central plane passing midway between opposite ends of said first clamp segment; and said first clamp segment including an inner surface having said crown located at said central plane such that, when said crown is in contact with said needle support member, an increasing clearance is provided between said inner surface of said first clamp segment and said needle support member in opposite directions from said crown.

5. The baler needle assembly, as defined in claim 1, wherein said inner end of said needle is defined by a first clamp segment symmetrical about a central plane passing midway between apposite ends of said first clamp segment; and said clamping arrangement including one of said inner surface of said first clamp segment and said first location of said support member including a first region which is concave in cross section, and another of said inner surface of said first clamp segment and said first location of said needle support including a second region shaped complementary to said central region of said inner surface of said first clamp segment.

6. The baler needle assembly, as defined in claim 5, wherein said second region of said needle support member is a ball segment.

7. The baler needle assemble, as defined in claim 1, wherein said clamping arrangement includes said needle support having a substantially cylindrical outer surface and includes said inner end of said needle being defined by a clamp segment having an inner surface formed at a radius larger than that of said cylindrical outer surface of said needle support so as to define a gap between said inner surface of said first clamp segment and said cylindrical outer surface; and said clamping arrangement further including a tapered shim arrangement located in said gap so as to define at least one inclined surface against which said clamp segment of said needle may be clamped so as to effect side-to-side adjustment of said outer end of the needle.

8. The baler needle assembly, as defined in claim 7, wherein said tapered shim arrangement includes a pair of shims having thicker dimensioned ends located in abutting relationship with each other at a central location between opposite ends of said clamp segment of said needle.

* * * * *